United States Patent
Chang et al.

(10) Patent No.: US 7,728,769 B2
(45) Date of Patent: Jun. 1, 2010

(54) ADAPTIVE PROCESSING METHOD OF CLUTTER REJECTION IN A PHASED ARRAY BEAM PATTERN

(75) Inventors: Kaichiang Chang, Northborough, MA (US); William Kennedy, Boston, MA (US)

(73) Assignee: Raytheon Company, Waltham, MA (US)

(*) Notice: Subject to any disclaimer, the term of this patent is extended or adjusted under 35 U.S.C. 154(b) by 116 days.

(21) Appl. No.: 12/075,510

(22) Filed: Mar. 12, 2008

(65) Prior Publication Data

US 2009/0231195 A1  Sep. 17, 2009

(51) Int. Cl.
    *H01Q 3/26* (2006.01)
(52) U.S. Cl. ..................... 342/360; 342/372
(58) Field of Classification Search ........... 342/360
    See application file for complete search history.

(56) References Cited

U.S. PATENT DOCUMENTS 5,557,282 A    9/1996  Mertens
5,592,178 A    1/1997  Chang et al.
6,977,610 B2   12/2005 Brookner et al.
7,038,615 B2   5/2006  Brookner

FOREIGN PATENT DOCUMENTS

JP    10270930 A  * 10/1998

OTHER PUBLICATIONS

Guy, R.F.E., "General Radiation-Pattern Synthesis Technique for Array Antennas of Arbitrary Configuration and Element Type," IEE Proceedings, vol. 135, Pt H, No. 4, Aug. 1988, pp. 241-248.*

* cited by examiner

*Primary Examiner*—Gregory C Issing
(74) *Attorney, Agent, or Firm*—Iandiorio Teska & Coleman

(57) ABSTRACT

An adaptive processing method of and system for clutter rejection in a phased array beam pattern. The amplitude distribution of the transmit elements of a two-dimensional phased array is determined. A desired pattern with low side lobes for a linear array is synthesized. The amplitude distribution of the transmit elements of the two-dimensional phased array is compared with the synthesized pattern. Select elements of the two-dimensional array are disabled to best fit the determined amplitude distribution of the transmit elements of the two-dimensional phased array to the synthesized beam pattern. Phase only pattern synthesis is performed to produce a desired two-dimensional beam pattern with low side lobes to minimize any best fit errors.

6 Claims, 7 Drawing Sheets

ADAPTIVE PROCESSING METHOD OF CLUTTER REJECTION IN A PHASED ARRAY BEAM PATTERN

FIELD OF THE INVENTION

This subject invention relates to phased array radar systems.

BACKGROUND OF THE INVENTION

A typical phased array radar system includes a number of transmit and receive modules each driven at a certain amplitude and phase. A beam steering generator sets the amplitude and phase of each transmit module. In this way, the radiation pattern is reinforced in a certain direction and suppressed in undesired directions.

The cost of such a system is typically driven by sensitivity which is a function of the number and design of the active transmit and receive modules. Phased array radars provide a spatial degree of freedom to shape the transmitted beams. Fully focused beams can be generated for high sensitivity missions and shaped and spoiled beams can be generated for lower sensitivity missions. The well-known Cosecant-squared beam pattern provides many of the advantages of sensitivity time control to avoid saturation and short pulse operation to minimize clutter return from uncompressed pulses.

An idealized phased array radar with a Cosecant-squared antenna pattern exhibits an optimal signal-to-noise ratio with low side lobes close to the radar site to detect targets in the presence of ground clutter.

Actual phased array radar systems, however, often have failures of the individual transmit and receive modules and/or include transmit and receive modules which are not used to produce the main beam. Other array blockages and voids are created by the presence of auxiliary and dummy elements.

As a result, the transmitted Cosecant-squared antenna pattern may have high side lobes which degrade effective clutter rejection.

BRIEF SUMMARY OF THE INVENTION

It is therefore an object of this invention to provide an adaptive processing method of clutter rejection in a phased array beam pattern.

It is a further object of this invention to provide such a method which determines the element weightings to generate a desired antenna beam pattern with low side lobes for effective clutter rejection.

It is a further object of this invention to provide such a method in which a Cosecant-squared antenna pattern with low side lobes can be generated.

It is a further object of this invention to provide a desired antenna pattern even in the presence of unpredicted failed elements.

It is a further object of this invention to provide, in one example, an inverted Cosecant-squared antenna pattern with −50 db side lobes in a two-dimensional phased array having an arbitrary profile.

It is a further object of this invention to provide, in one example, method which produces an inverted Cosecant-squared antenna pattern with −50 db side lobes for a two-dimensional phased array having an arbitrary profile due to the irregular building blocks and auxiliary antenna blockage.

The subject invention results from the realization that antenna pattern synthesis can be performed in two steps. First, the amplitude weights from the ideal linear array pattern synthesis are approximated with element on/off control (including failures, and blockages). Second, the exact, quantized element amplitude pattern is used in a phase only pattern synthesis. The resultant antenna pattern has the desired pattern with low side lobe characteristics. Unlike the received antenna pattern which is controlled by both the amplitude and phase of the transmit and receive modules, the transmitted antenna pattern is controlled solely by phase and the operational state of transmit and receive modules.

The subject invention, however, in other embodiments, need not achieve all these objectives and the claims hereof should not be limited to structures or methods capable of achieving these objectives.

This subject invention features an adaptive processing method of clutter rejection in a phased array beam pattern. The preferred method comprises determining the amplitude distribution of the transmit elements of a two-dimensional phased array, synthesizing a desired pattern with low side lobes for a linear array, and comparing the amplitude distribution of the transmit elements of the two-dimensional phased array with the synthesized pattern. Then, select elements of the two-dimensional array are disabled to best fit the determined amplitude distribution of the transmit elements of the two-dimensional phased array to the synthesized beam pattern. Phase only pattern synthesis is performed to produce a desired two-dimensional beam pattern with low side lobes to minimize any best fit errors.

In one example, the desired beam pattern is a Cosecant-squared beam pattern. The desired beam pattern may be formed by a two-dimensional array having an arbitrary configuration including blockages and voids produced by auxiliary antennas and dummy elements. Typically, the desired beam pattern is formed in real time to heal element features for high reliability. The desired beam pattern may be an arbitrary pattern with a deep spatial notch for electronic counter countermeasures.

A phased away radar system in accordance with the subject invention includes a plurality of transmit and receive modules each selectively enabled. A beam steering generator controls the phase of the transmit (e.g., programmed) determine the amplitude distribution of the transmit and receive modules, compare the amplitude distribution of the transmit and receive modules with the synthesized pattern, enable select transmit and receive modules to best fit the determined amplitude distribution to the synthesized beam pattern, and perform phase only pattern synthesis to produce a desired two-dimensional beam pattern with low side lobes.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
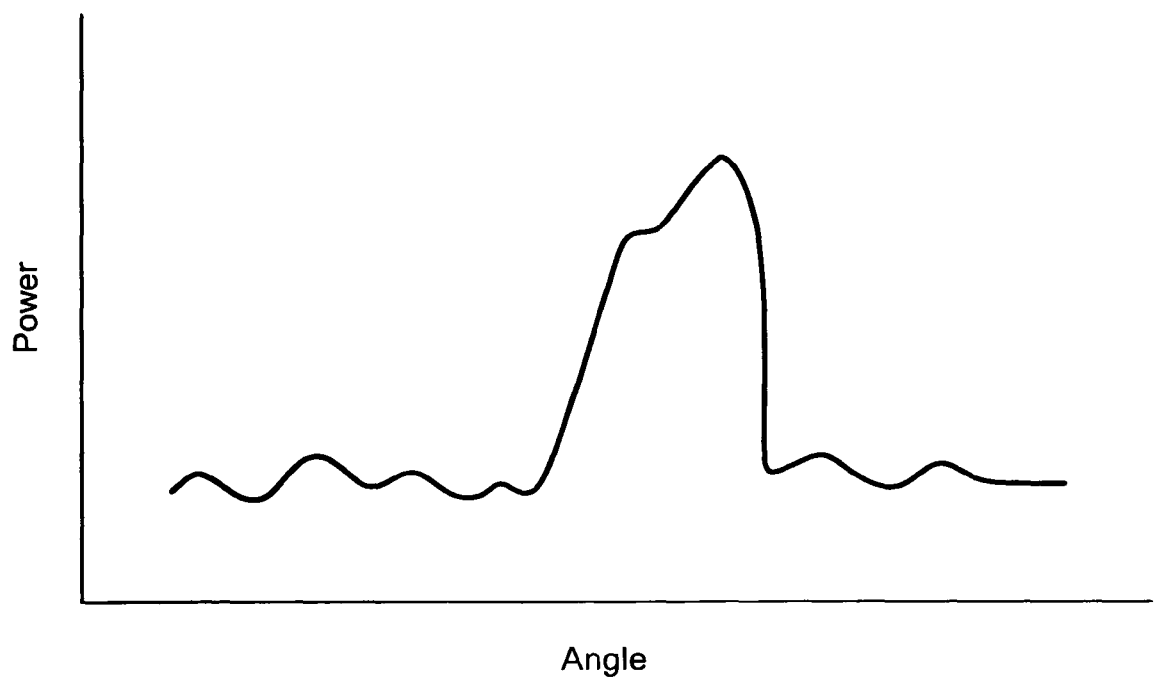
FIG. 1 is a highly schematic plot showing the idealized amplitude distribution of a two-dimensional phased array Cosecant-squared pattern.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an idealized amplitude distribution of a two-dimensional phased array Cosecant-squared pattern with low side lobes. Such an idealized pattern is not always realized due to the failure of transmit and receive modules in the two-dimensional array, the geometry of the array, and/or transmit and receive modules which are not used to produce the main beam.

Figure 2:
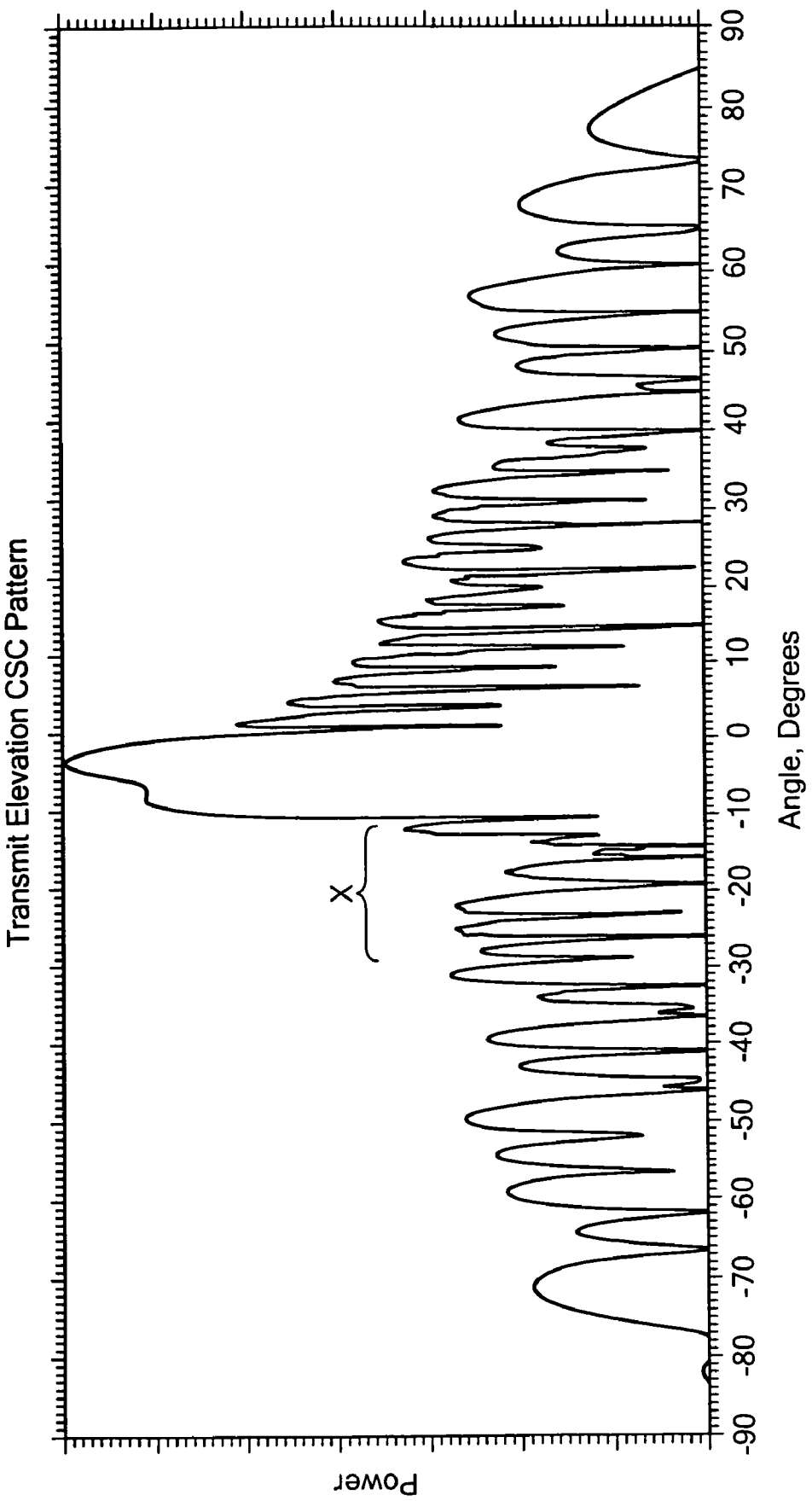
FIG. 2 is a highly schematic plot of the amplitude distribution of an actual Cosecant-squared beam pattern showing the presence of undesirable high side lobes.

FIG. 2 shows an actual phased array Cosecant-squared beam pattern with undesirable high side lobes in region X. This is due to the failure of certain transmit and receive modules, the geometry of the array, and the like.

Figure 3:
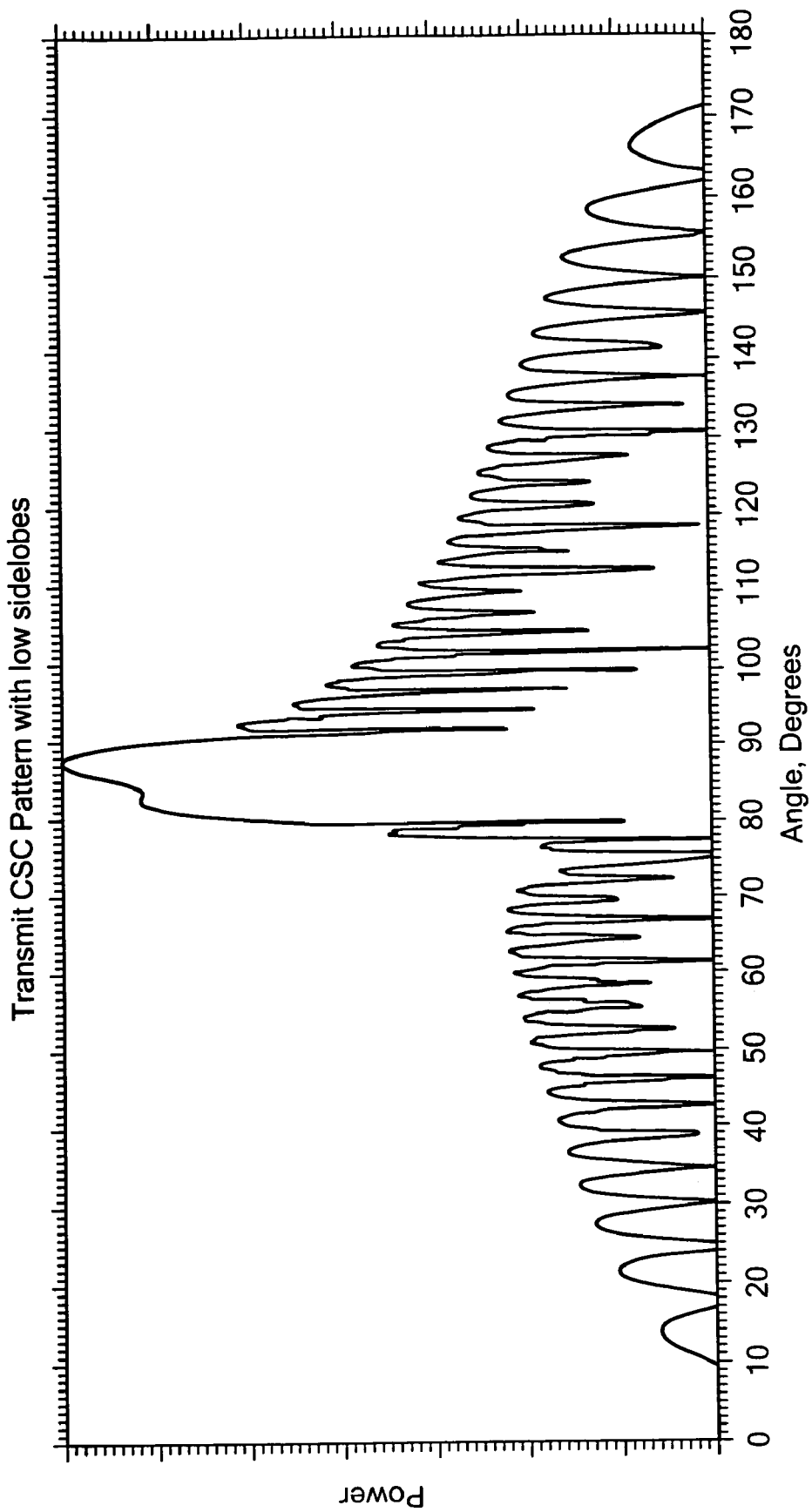
FIG. 3 is a highly schematic plot of a typical synthesized Cosecant-squared beam pattern with low side lobes for a linear array.

It is known in the art to synthesize a Cosecant-squared pattern for a linear array. See "A method of $CSC^2$ pattern synthesis for planar phased arrays" by Huang Zhengxing and Ruan Yingzheng, Antennas and Propagation Society International Symposium, 1985, V. 23, pp. 479-482. FIG. 3 shows a typical Cosecant-squared pattern with low side lobes for a linear array synthesized in this fashion.

Figure 4:
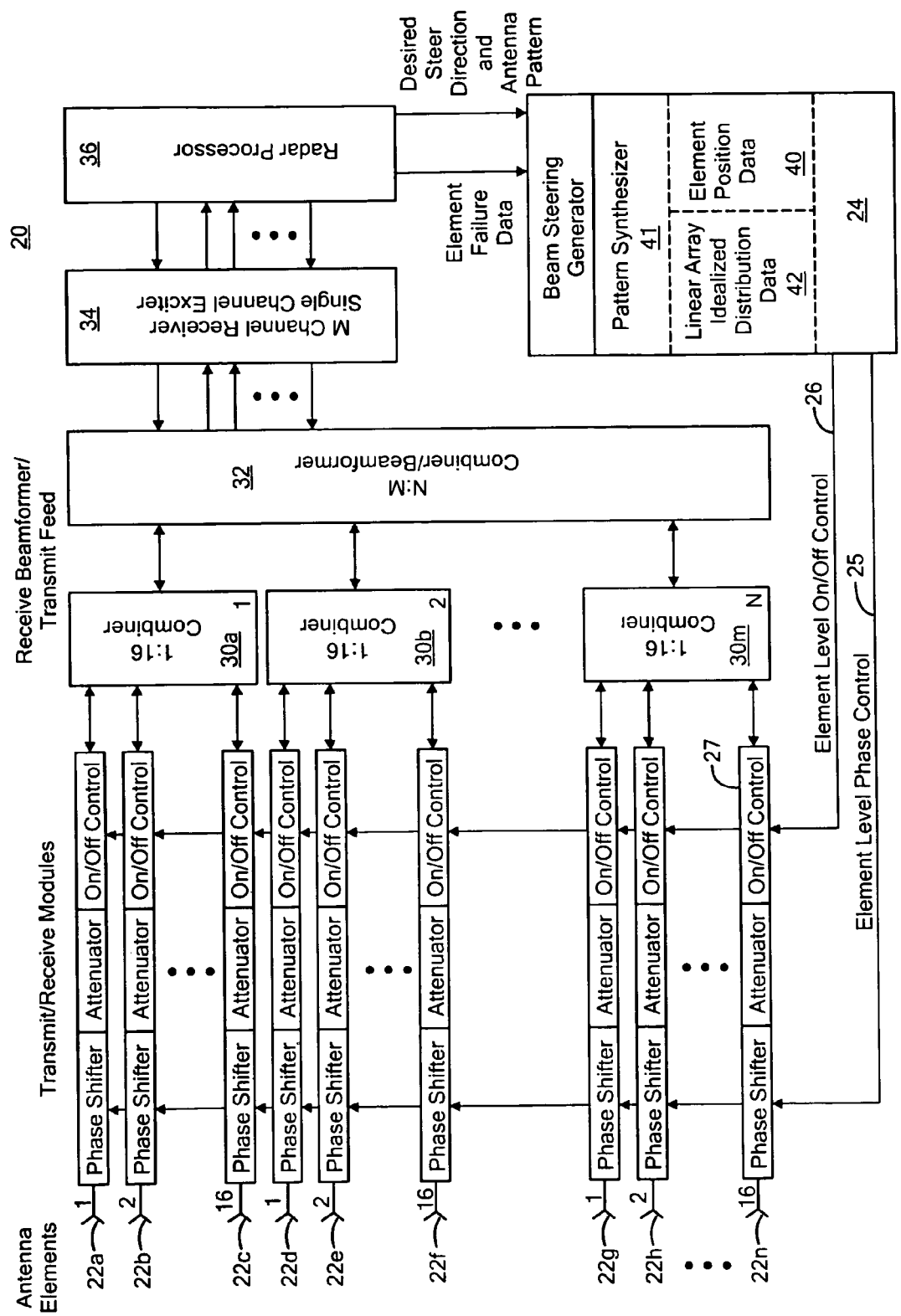
FIG. 4 is a schematic block diagram showing the primary components associated with an example of a radar system in accordance with the subject invention.

FIG. 4 shows phase 2-D array radar system 20 with numerous transmit and receive modules 22a-22n. Combiners 30a-30m, combiner/beam former 32, receiver and single channel exciter 34, and radar processor 36 are conventional. In accordance with the subject invention, radar processor 36 provides element failure data and the desired beam steer direction and antenna pattern to beam steering generator 24 which includes database 40 containing transmit element position data.

Based on this data, beam steering generator 24 sets the phase of each transmit module as shown via line 25. Each transmit and receive module also includes an on/off control function 27 to selectively enable and disable individual transmit modules. In this way, for example, any one of a group of transmit elements can be turned off and thus not used to produce radar energy which contributes to the transmitted beam.

Figure 5A:
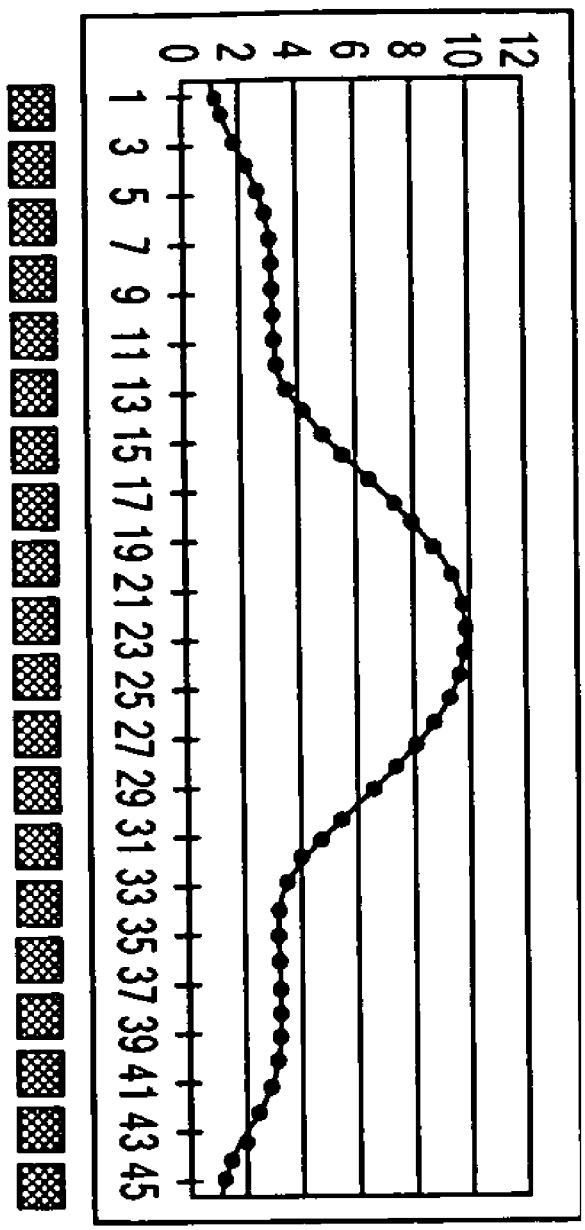
FIGS. 5A-5F schematically depict the primary steps associated with an example of a processing method in accordance with the subject invention.

Beam steering generator 24 is programmed to enable or disable certain transmit elements as shown via line 26. Beam steering generator 24 is programmed using pattern synthesizer 41 to determine the amplitude distribution of the transmit elements of a two-dimensional phased array radar based on the antenna geometry of element position data 40 and the operability state of each element using element failure data received from processor 36. See FIG. 5B-5C. That distribution is then compared to an idealized distribution for a linear array (see FIG. 5A) which is stored as linear array idealized distribution data 42 with constant linear spacing producing a Cosecant-squared pattern with low side lobes as shown in FIG. 3.

Figures 5B, 5C, 5D:
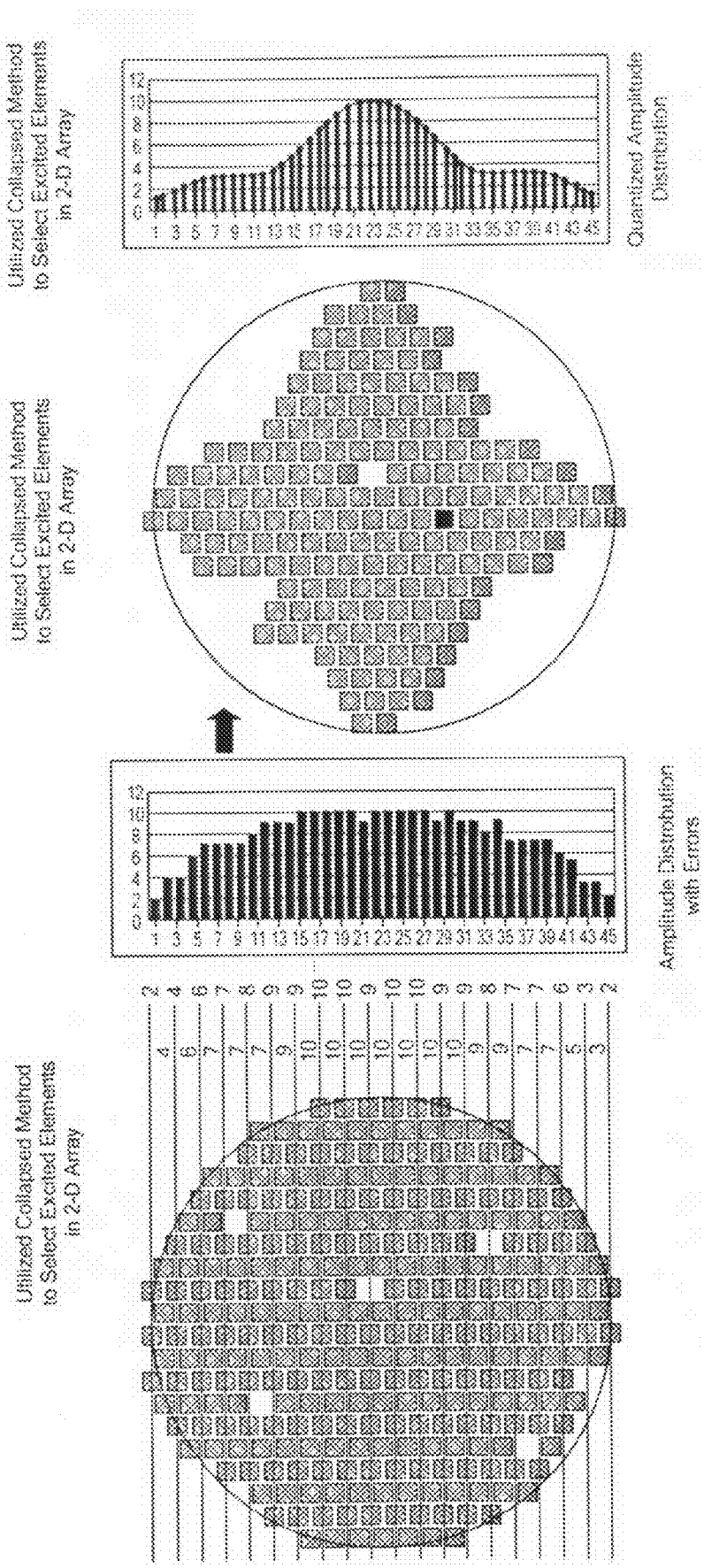
Figures 5E, 5F:
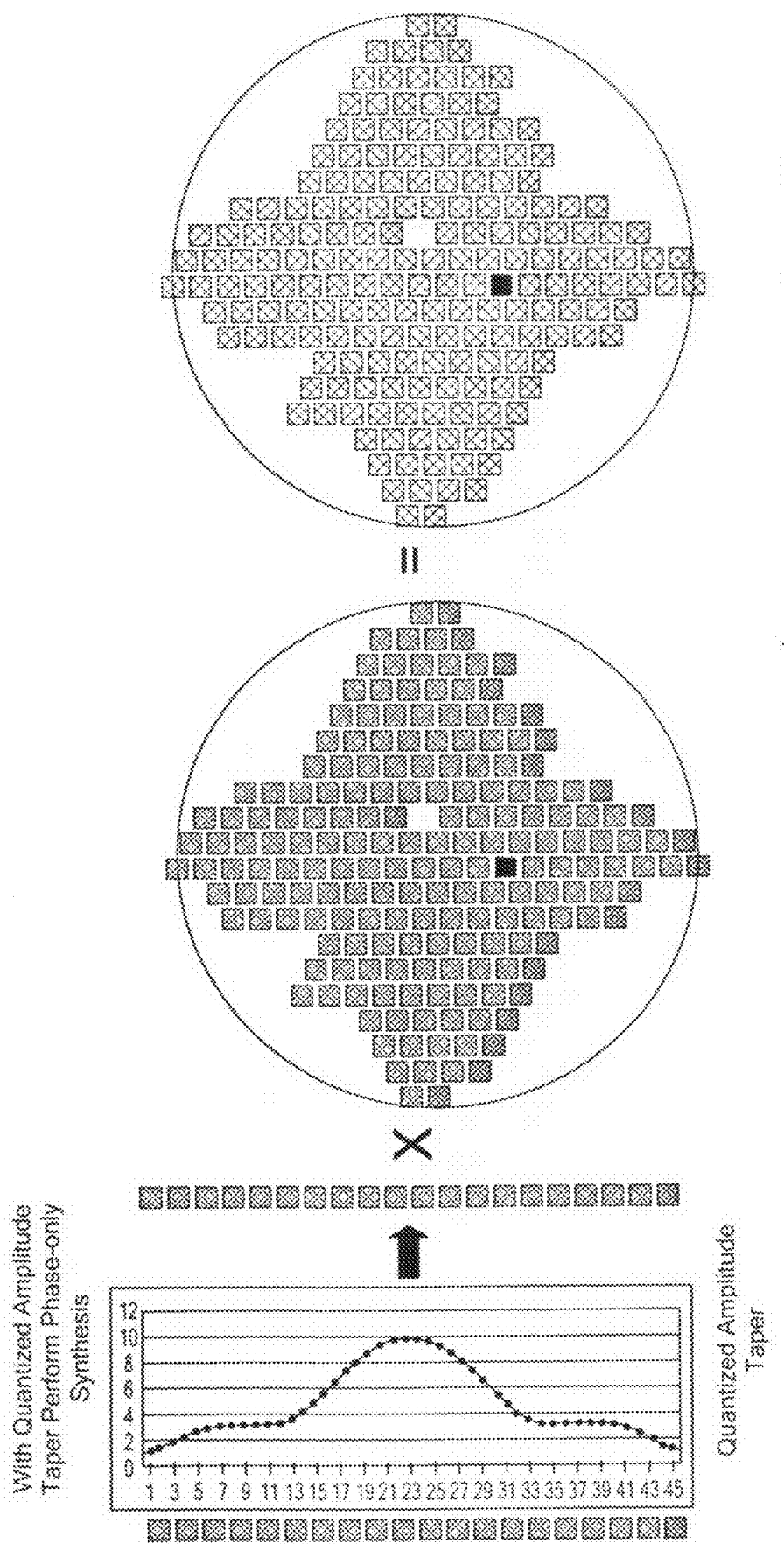

Pattern synthesizer 41 selects transmit elements of the two-dimensional array to be disabled via line 26, FIG. 4 to best fit the amplitude distribution of the transmit elements of the two-dimensional phased array radar with the idealized distribution of the linear array as shown in FIG. 5D. Then, based on the best fit analysis, pattern systhesizer 41 performs phase only pattern synthesis to produce a two-dimensional Cosecant-squared beam pattern with low side lobes to minimize any best fit errors as shown in FIG. 5E. Beam steering generator 24 then applies phase weighting to the two-dimensional array as shown in FIGS. 5E-5F.

Although the method discussed above is used to produce a Cosecant-squared beam pattern, any desired beam pattern can be produced in the same manner. Pattern synthesizer 41 uses the most efficient method to perform amplitude and phase pattern synthesis for a linear array and then uses a collapsed method to select exited elements in a two-dimensional array. Based on the configuration of the exited elements in a two-dimensional array, new amplitude weightings in a linear array are obtained. Based on these new amplitude weightings, phase-only pattern synthesis is performed for a Cosecant-squared antenna pattern with low side lobes. The phase weightings are applied to the two-dimensional array resulting in an inverted Cosecant-squared antenna pattern with −50 db side lobes. This method is applicable to a two-dimensional phased array having an arbitrary profile due to a irregular building blocks, failed elements, and auxiliary antenna blockage. The process can be used to perform array healing in real time using element failure data when any element fails for increasing the reliability of the array.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An adaptive processing method of clutter rejection in a phased array beam pattern, the method comprising:
   determining the amplitude distribution of the transmit elements of a two-dimensional phased array;
   synthesizing a desired pattern with low side lobes for a linear array;
   comparing the amplitude distribution of the transmit elements of the two-dimensional phased array with the desired pattern;
   disabling select transmit elements of the two-dimensional array to best fit the determined amplitude distribution of the transmit elements of the two-dimensional phased array to the synthesized beam pattern; and performing phase only pattern synthesis to produce a desired two-dimensional beam pattern with low side lobes to minimize any best fit errors.

2. The method of claim 1 in which the desired beam pattern is a Cosecant-squared beam pattern.

3. The method of claim 1 in which the desired beam pattern is formed by a two-dimensional array having an arbitrary configuration including blockages and voids produced by auxiliary antennas and dummy elements.

4. The method of claim 1 in which the desired beam pattern is formed in real time to heal element features for high reliability.

5. The method of claim 1 in which the desired beam pattern is an arbitrary pattern with a deep spatial notch for electronic counter countermeasures.

6. A phased array radar system comprising:
a plurality of transmit and receive modules each selectively enabled; and
a beam steering generator which controls the phase of the transmit And receive modules, the beam steering generator configured to:
  determine the amplitude distribution of the transmit and receive modules,
  synthesize a desired pattern with low side lobes for a linear array,
  compare the amplitude distribution of the transmit and receive modules with the desired pattern,
  enable select transmit and receive modules to best fit the determined amplitude distribution to the synthesized beam pattern, and
  perform phase only pattern synthesis to produce a desired two-dimensional beam pattern with low side lobes.

\* \* \* \* \*